United States Patent [19]
Luper

[11] Patent Number: 6,011,461
[45] Date of Patent: *Jan. 4, 2000

[54] DETECTION OF TRUCK SPEED SENSOR FAILURE USING GPS

[75] Inventor: Jack F. Luper, Winston-Salem, N.C.

[73] Assignee: Eaton Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/767,241

[22] Filed: Dec. 13, 1996

[51] Int. Cl.⁷ ..................................... B60Q 1/00
[52] U.S. Cl. ..................... 340/441; 340/825.49; 701/34
[58] Field of Search .................. 340/825.49, 441, 340/992, 466, 686; 701/34, 213–217; 73/490; 342/458; 246/5; 701/110, 201, 207, 221

[56] References Cited

U.S. PATENT DOCUMENTS

| 5,129,605 | 7/1992 | Burns et al. | 246/5 |
| 5,400,254 | 3/1995 | Fajita | 701/213 |
| 5,471,393 | 11/1995 | Bolger | 701/217 |
| 5,539,647 | 7/1996 | Shibata et al. | 701/221 |

Primary Examiner—Edwin C. Holloway, III
Attorney, Agent, or Firm—Charles E. Kosinski

[57] ABSTRACT

A system (10) and method for detecting a speed sensor failure in a vehicle equipped with a geographic position determining system such as a GPS system (14). An on-board processor (12) compares vehicle travel distance calculations made using speed sensor (20) information to distance calculations performed using positional information. Discrepancies therebetween are used to indicate errors in the information provided by the speed sensor, or conversely, by the positioning system.

15 Claims, 2 Drawing Sheets

DETECTION OF TRUCK SPEED SENSOR FAILURE USING GPS

BACKGROUND AND SUMMARY OF THE INVENTION

The present invention relates generally to vehicle sensor failure detection and, more specifically, to a system and method for detecting a failure in a vehicle speed sensor when the vehicle is also equipped with a vehicle position determination sensor.

Various types of electronic sensors are becoming more prevalent on vehicles, especially on fleets of vehicles wherein it is desirable to monitor certain information as a fleet vehicle covers a particular route. One type of sensor becoming common on these vehicles is a present vehicle position sensor, used to keep track of the geographic location of the vehicle in order to provide automated trip reporting and routing capabilities. This type of system is also becoming increasingly popular for use in automobile navigation systems. One of the most common systems of this type is a global positioning system (GPS) through which a receiver installed on the vehicle can receive information indicative of the present geographic position of the receiver, and hence the vehicle, by capturing signals transmitted over geostationary satellite.

In general, GPS systems are used to allow a receiver to determine its geographical position based upon signals received from multiple orbiting satellites. In navigational applications of GPS, the latitude, longitude and altitude of any point close to the surface of the earth can be calculated from the propagation times of electromagnetic energy transmitted from four or more satellites to the receiver location. In vehicular applications, the GPS system is electronically connected to a microprocessor-based controller installed on the vehicle, generally referred to as an on-board computer (OBC), which performs various navigational tasks with information received. While such systems work very well in providing intended navigational and other capabilities, the data obtained can also be used to accomplish additional functions, thereby making better use of the equipment and adding to its cost justification.

The system and method of the present invention further utilizes data obtained from a GPS receiver to detect failures in a vehicle's speed sensor. This sensor is typically a speedometer or other sensing device which provides a signal indicative of the vehicle's velocity or acceleration. By electronically connecting both the speed sensor and GPS receiver to the vehicle's OBC, the distance traveled by the vehicle according to information obtained from the speed sensor can be compared to distance measurements obtained through the GPS position sensor. Discrepancies between the measurements can be used to indicate sensor faults and/or failures.

In accordance with the present invention, a vehicle's geographic position is obtained with a GPS or other similar position determining system. Once a predetermined amount of time has expired, a vehicle speed is obtained from the speed sensor and a second geographic position is determined. A set of distance calculations are then made, the first by multiplying the speed measurement by the predetermined time period. The second distance measurement is made by finding the linear distance between the last two position points obtained by the position determining system. If these distance measurements fall within a predetermined tolerance of one another, it can be assumed that the speed sensor is functioning properly. Wide discrepancies, however, indicate some type of system error such as a speed sensor failure. Conversely, if the speed sensor is determined to be functioning properly, there may be errors in the position sensing system.

Therefore, the present invention allows speed sensor systems to be monitored for failure without requiring any additional hardware to be implemented on the vehicle. The speed and position data obtained can also be used to provide calibration data for the various sensing devices, thereby providing an inherent redundancy in these systems and maximizing the cost efficiency as well as usefulness of an on-board vehicle position determining system.

These and other features and advantages of the present invention will become apparent to one of skill in the art upon review of the following description, taken in conjunction with the accompanying drawings.

DETAILED DESCRIPTION OF THE PREFERRED EMBODIMENT

Figure 1:
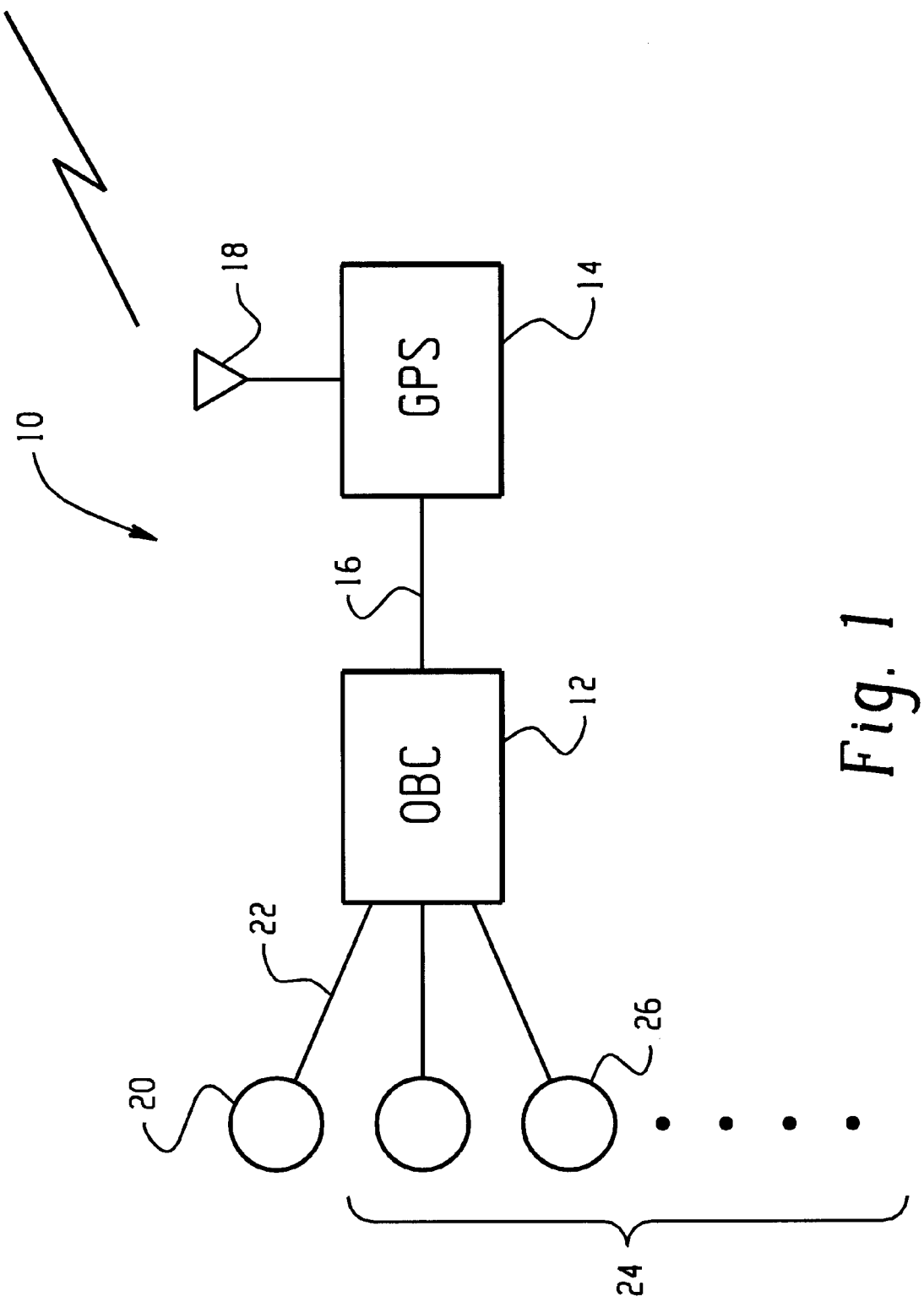
FIG. 1 is a schematic diagram of the hardware components of a system built in accordance with the teachings of the present invention.

Turning now to the drawings, and in particular to FIG. 1, the speed sensor failure detection system of the present invention is indicated generally at 10. System 10 is installed on the vehicle and includes an on-board microprocessor-based controller or computer (OBC) 12 which is used to electronically monitor and control various vehicle functions. Preferably, OBC 12 includes means for interfacing with a user, typically the vehicle driver, such as through a keypad and visual display screen. OBC 12 can be a single computer or a set of interconnected individual processors and includes data storage or memory capability, as well as communication capability which facilitates bi-directional data and command exchange with various electronic components which are conductively coupled thereto.

One such on-board component is a vehicle geographical position sensor such as a GPS system 14 which is connected to OBC 12 over line 16. While line 16 may be a wire, this connection could alternately be made over radio frequency, microwave or any other suitable communication means. GPS system 14 receives data indicative of the present geographic location of the receiver 14, and therefore the vehicle, in the form of latitude and longitude coordinates, via signals transmitted by satellite and captured through antenna 18. However, the present vehicle position signal provided to OBC 12 could alternately be provided in any other convenient format, such as in Cartesian or spherical coordinates, and by any other suitable means, such as a Loran system.

OBC 12 is also adapted to receive an electronic signal indicative of the present velocity of the vehicle, such from a speed sensor 20 over communication path 22. In the exemplary embodiment being described herein, speed sensor 20 is a conventional vehicle speedometer but could alternately be any type of device which produces an electronic output signal indicative of the velocity or acceleration of the vehicle. OBC 12 is preferably also electrically connected to a plurality of other devices 24, useful in performing various tasks and preferably including an additional transceiver to allow OBC 12 to communicate via rf or other wireless means to a vehicle base station or dispatch center.

Figure 2:
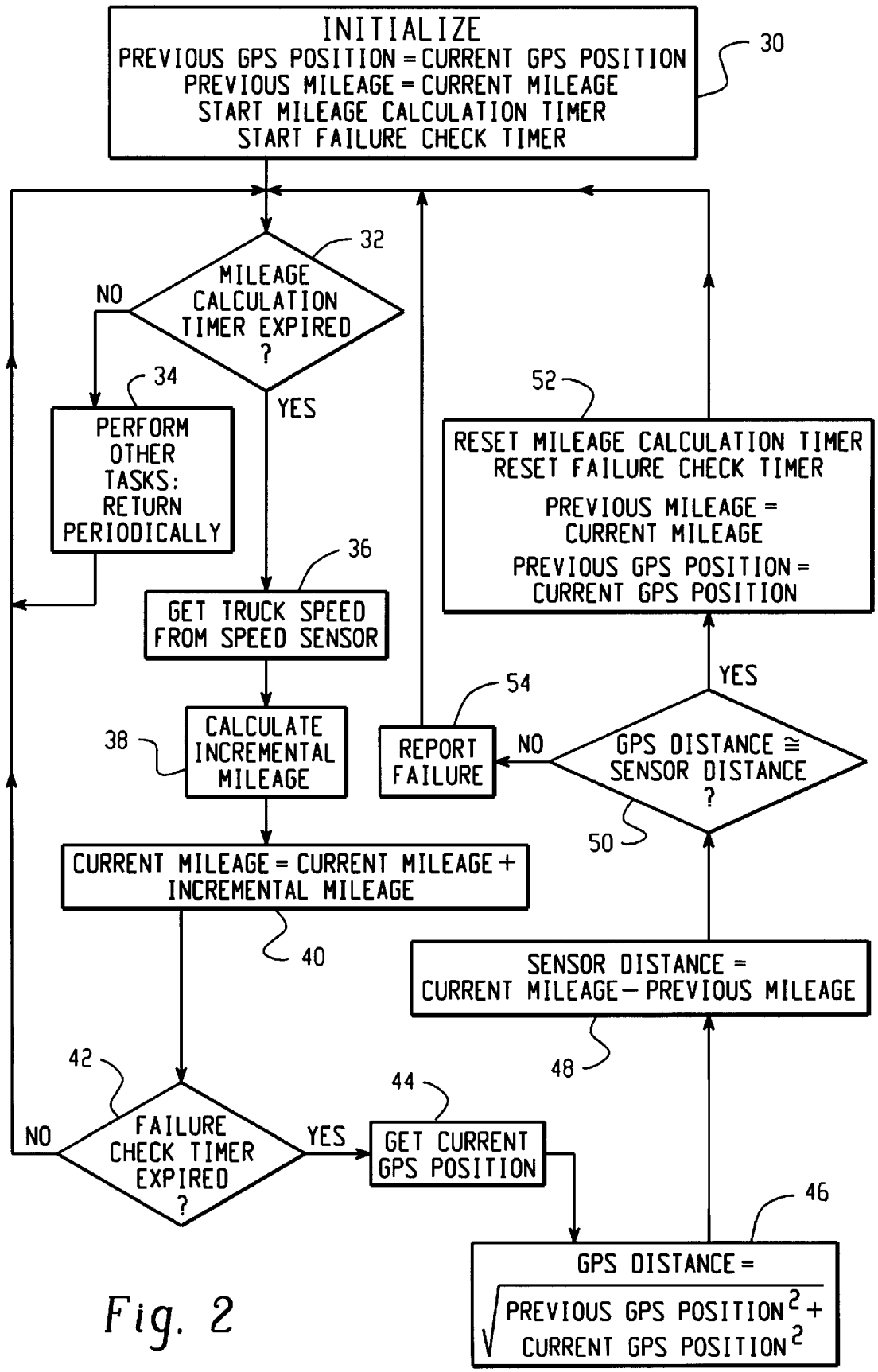
FIG. 2 is a flow chart illustrating the method by which the system shown in FIG. 1 detects speed sensor failures.

The method by which the present system 10 carries out its speed sensor failure detection function can best be described with reference to the flow chart of FIG. 2. This method is preferably implemented in software which is executed by OBC 12 but could alternately be carried out in any other fashion known to those of skill in the art. As indicated in FIG. 2, the method begins at block 30 with the performance of an initialization routine in which various parameters stored in corresponding memory locations of OBC 12 are assigned preliminary values. This initialization routine includes the setting of all necessary initial values, including setting a previous GPS position parameter with the most current GPS position, or that position most recently obtained by GPS receiver 14. This information is preferably stored in digital form as latitude and longitude coordinate data points in a designated address but this could be accomplished in any other manner apparent to those having skill in the art.

The initialization routine similarly includes replacing the value stored in a previous mileage storage location with the "current mileage", the current mileage being that last calculated in the preceding iteration of the routine as described herebelow. Also, a mileage calculation timer and a failure check timer are started. These timers count the passage of time until a prestored value is reached, the preset values being determined according to the desired time to trigger other parts of the routine as described below, but in this exemplary embodiment the mileage calculation timer is set at 1 second and the failure check timer is set at 1 minute.

Upon completion of these various initialization processes, a check is made by OBC 12 at decision block 32 to determine whether or not the time period set by the mileage calculation timer has expired. Until this time period has expired, OBC 12 performs other assigned tasks at block 34 for various trip reporting and other such functions, periodically returning to decision block 32. Once the mileage calculation timer has expired, the current vehicle speed is obtained by OBC 12 from sensor 20. Sensor 20 can be queried by OBC 12 over line 22 in order to trigger the receipt of the speed information or this information can be sent by sensor 20 to OBC 12 on a periodic basis, with each newly acquired speed value replacing the previously stored value. Using the speed value obtained in block 36, incremental vehicle mileage is calculated in block 38. This can be accomplished in any suitable manner well known to those of skill in the art, such as by multiplying the speed obtained in block 36 by the amount of time which has expired since the incremental vehicle mileage was last calculated.

While vehicle speed may vary anywhere from 0 mph to over 70 mph, and the vehicle can also move along convoluted paths or in a reverse direction, the accuracy of the mileage calculation in block 38 can be effectively controlled via the time period stored in the mileage calculation timer. By selecting a time period which is sufficiently small, accuracy can be held to a desired level. This time period can also be varied depending on factors such as whether the vehicle typically travels small distances at varying speeds, such as in a city, or traverses long spans of interstate highway. Since speed sensor failures most often occur in the form of erroneous 0 mph readings when the vehicle is in fact moving, very high accuracy levels are generally not needed for speed sensor failure detection. However, for alternative applications, and wherein the accuracy of the GPS or other similar position location system is sufficient, overall system accuracy can be improved by minimizing the time period between successive speed sensor readings.

A new current mileage value is updated in block 40 by adding the incremental mileage calculated in block 38 to the previously stored current mileage value. The failure check timer set in initialization block 30 is queried at decision block 42 to determine whether a predetermined time period between speed sensor failure checks has elapsed. This time period is preferably set to an appropriate value depending upon the application and other factors, in the present exemplary embodiment about 1 minute. Until the point wherein that period of time has elapsed, control returns to decision block 32 wherein OBC 12 performs various other tasks unrelated to the present application and, upon expiration of the mileage calculation timer, updates the current mileage value.

Once the failure check time has expired in decision block 42, the current geographical position of the vehicle is obtained by GPS unit 14 in block 44. Using this information, the GPS distance calculation can then be made in block 46. This calculation is preferably made as the square root of the sum of the squares of the GPS position coordinates previously obtained and the GPS position coordinates most recently obtained in block 44. Although calculation of distance in this manner is an approximation because latitude and longitude lines are curved, any other suitable manner of performing this calculation known to those of skill in the art could alternately be used. The particular method selected could, of course, depend on the accuracy required and could also take into consideration additional factors such as the direction that the vehicle had traveled in.

The distance of vehicle travel, as obtained by speed sensor 20, is then calculated in block 48 as the current mileage last calculated in block 40 minus the previous mileage as updated in initialization block 30. The GPS distance calculated in block 46 is then compared to the sensor distance obtained in block 48. If these distances fall within a predetermined tolerance of one another, parameters are updated in block 52 and the process repeats. In the present exemplary embodiment this tolerance is about ¼ mile, but is preferably dependent upon factors such as the accuracy of the GPS readings. In block 52, the mileage calculation and failure check timers are reset, the current mileage as determined in block 40 is stored in place of the previously stored mileage and the previously stored GPS position is replaced with the position last obtained in block 44.

If, in decision block 50, the GPS distance from block 46 is not within the specified tolerance of the sensor distance from block 48, a failure or error is reported at block 54. At this point, the present routine can be repeated one or more times in order to confirm the existence of a failure and rule out the possibility of an anomalous situation. If an error is in fact discovered, OBC 12 preferably communicates this determination to the driver, such as via a message displayed on a screen display or by some other type of audible or visual indication. This condition can be stored in memory of OBC 12 for later use and could alternately be sent by transceiver 26 to a central computer or base station.

Thus, the present system and accompanying method provide a simple and effective means by which failures of a vehicle speed sensor can be identified. Conversely, the system and method could likewise be used to find failures in the GPS or other positioning system by identifying discrepancies between speed sensor and position sensor readings. For instance, this system and method could provide data for the OBC when the GPS system is in a city, mountain range or other geographic environment wherein it is unable to acquire later from a sufficient number of satellites in order to determine its position. The present system could also be used to calibrate these systems as well as provide various other functions readily apparent to those of skill in the art.

The foregoing discussion disclosed and describes merely an exemplary embodiment of the present invention and various changes and modifications can be made therein without departing from the spirit and scope of the invention as defined in the following claims.

What is claimed is:

1. A method for detecting an error in either of a vehicle speed sensor or vehicle geographic position determining system, said method comprising the steps of:

obtaining a first vehicle geographic position with said position determining system;

starting a timer for indicating the expiration of a predetermined period of time;

upon expiration of said predetermined period of time:
  obtaining a current vehicle speed measurement from said vehicle speed sensor;
  obtaining a second vehicle geographic position with said position determining system;
  calculating a first distance traveled by said vehicle by multiplying said current vehicle speed measurement by said predetermined time period;
  calculating a second distance traveled by said vehicle by calculating the distance between said first and second vehicle geographic positions;
  comparing said first and second distances; and
  indicating an error if said first and second distances are not within a predefined tolerance of one another.

2. The method of claim 1 wherein said vehicle geographic position determining system is a global positioning system and said first and second vehicle geographic positions are in the form of latitude and longitude coordinates.

3. The method of claim 2 wherein said second distance traveled by said vehicle is calculated as the square root of the sum of the squares of the latitudinal distance between said first and second vehicle geographic positions and the longitudinal distance between said first and second vehicle geographic positions.

4. The method of claim 1 wherein said speed sensor is the vehicle's speedometer.

5. A system for detecting an error in either of a vehicle speed sensor or a vehicle position determining system, said system for detecting being installed on said vehicle and comprising:

a vehicle speed sensor adapted to generate an output signal indicative of an instantaneous vehicle speed measurement;

a vehicle geographic position determining system, said position determining system being adapted to generate an output signal which includes a location indicative point indicative of the present geographical location of said vehicle;

a first timer for determining and indicating the expiration of a first predetermined period of time;

a processor adapted for receiving said speed sensor output signal and said output signal from said position determining system, said processor using said speed sensor output signal to determine a first distance value representative of the total distance traveled by said vehicle during said first predetermined period of time, said processor receiving a first location indicative point from said position determining system at the initiation of said first predetermined period of time and a second location indicative point upon the expiration of said first predetermined period of time, said processor determining a second distance value representative of the distance between said first and second location indicative points, said processor comparing said first distance value to said second distance value and generating an error output signal when said comparison is not within a predefined tolerance level; and an error indicating device coupled to said processor for receiving said error output signal and indicating an error condition.

6. The system of claim 5 wherein said vehicle geographic position determining system is a global positioning system and said first and second location indicative points are in the form of latitude and longitude coordinates.

7. The system of claim 6 wherein said second distance value is calculated as the square root of the sum of the squares of the latitudinal distance between said first and second location indicative points and the longitudinal distance between said first and second location indicative points.

8. The system of claim 5 wherein said speed sensor is the vehicle's speedometer.

9. The system of claim 5 further including a transceiver for communicating with a ground station computer.

10. The system of claim 5 further including a motion sensor for detecting a reverse motion of said vehicle, said motion sensor being adapted to provide a signal indicative of said motion to said processor.

11. The system of claim 5 further including a second timer for repeatedly determining and indicating the expiration of a second predetermined period of time that is of shorter duration than said first predetermined period of time, said processor receiving a present speed sensor output signal associated with each second predetermined period of time, said processor using said present speed sensor output signal to calculate an incremental distance value associated with each said second predetermined period of time, said processor determining said first distance value by summing said incremental distance values calculated during said first predetermined period of time.

12. A method of detecting an error in either of a vehicle speed sensor or vehicle geographic position determining system, said method comprising the steps of:

obtaining a first vehicle geographic position with said position determining system;

starting a first timer adapted to indicate the expiration of a first predetermined period of time;

starting a second timer adapted to indicate the expiration of a second predetermined period of time of shorter duration than said first predetermined period of time, said second timer timing said second predetermined period of time throughout the duration of said first predetermined period of time;

obtaining a current vehicle speed measurement from said vehicle speed sensor associated with each said second predetermined period of time;

using said current vehicle speed measurement to calculate an incremental distance value associated with each said second predetermined period of time; and upon expiration of said first predetermined period of time:
  obtaining a second vehicle geographic position with said position determining system;
  calculating a first distance traveled by said vehicle by summing said incremental distance values;
  calculating a second distance traveled by said vehicle by determining the distance between said first and second vehicle geographic positions;
  comparing said first and second distances; and
  indicating an error if said first and second distances are not within a predefined tolerance of one another.

13. The method of claim 12 wherein said vehicle geographic position determining system is a global positioning system and said first and second vehicle geographic positions are in the form of latitude and longitude coordinates.

14. The method of claim 13 wherein said second distance traveled by said vehicle is calculated as the square root of the sum of the squares of the latitudinal distance between said first and second vehicle geographic positions and the longitudinal distance between said first and second vehicle geographic positions.

15. The method of claim 12 wherein said speed sensor is the vehicle's speedometer.

* * * * *